United States Patent [19]

Best

[11] Patent Number: 4,634,751
[45] Date of Patent: Jan. 6, 1987

[54] POLYMERIZATION CATALYST, PRODUCTION AND USE

[75] Inventor: Steven A. Best, Houston, Tex.

[73] Assignee: Exxon Research & Engineering Co., Florham Park, N.J.

[21] Appl. No.: 806,730

[22] Filed: Dec. 9, 1985

Related U.S. Application Data

[62] Division of Ser. No. 680,871, Dec. 12, 1984, Pat. No. 4,579,835.

[51] Int. Cl.$^4$ ................................................ C08F 4/68
[52] U.S. Cl. .................................... 526/129; 526/143; 526/124; 526/348.6; 526/352
[58] Field of Search ................................. 526/129, 143

[56] References Cited

U.S. PATENT DOCUMENTS 3,354,139 11/1967 Vandenberg .
4,385,161 5/1983 Caunt et al. .
4,434,242 2/1984 Roling et al. .
4,508,842 4/1985 Beran et al. .

FOREIGN PATENT DOCUMENTS 0055589 7/1982 European Pat. Off. .
422192 8/1982 U.S.S.R. .

Primary Examiner—Patrick P. Garvin
Attorney, Agent, or Firm—M. B. Kurtzman

[57] ABSTRACT

A vanadium containing catalyst component useful for polymerizing olefins to polyolefins having a high molecular weight and broad molecular weight distribution comprising polymerizing the olefins in the presence of a catalyst comprising (a) a vanadium containing catalyst component obtained by contacting an inert support material with an organoaluminum compound, an acyl halide and a vanadium compound, and (b) an aluminum alkyl cocatalyst.

9 Claims, No Drawings

POLYMERIZATION CATALYST, PRODUCTION AND USE

This is a division of application Ser. No. 680,871, filed Dec. 12, 1984, now U.S. Pat. No. 4,579,835.

BACKGROUND OF THE INVENTION

This invention relates to a novel solid catalyst component to be employed with a cocatalyst for use in the polymerization of olefins to polyolefins such as polyethylene, polypropylene and the like, or copolymers such as ethylene copolymers with other alpha-olefins and diolefins, which catalyst component shows unusually high activity, excellent hydrogen response for the control of polymer molecular weight and good comonomer response for the production of copolymers. The polymer product obtained has a good balance of polymer properties, for example, the catalyst system obtains a polymer with a broad molecular weight distribution and an improved balance in polymer product machine direction tear strength and transverse direction tear strength. As a result, the blown film produced from the polymer product manifests an overall higher strength.

The catalyst component comprises a solid reaction product obtained by contacting a solid, particulate, porous support material such as, for example, silica, alumina, magnesia or mixtures thereof, for example, silica-alumina, with an organoaluminum compound, a vanadium compound and an acyl halide. The novel catalyst component, which when used with an aluminum alkyl cocatalyst, provides the novel catalyst system of this invention which can be usefully employed for the polymerization of olefins.

The catalyst system can be employed in slurry, single-phase melt, solution and gas-phase polymerization processes and is particularly effective for the production of linear polyethylenes such as high-density polyethylene and linear low density polyethylene (LLDPE).

It is known that catalysts of the type generally described as Ziegler-type catalysts are useful for the polymerization of olefins under moderate conditions of temperature and pressure. It is also well known that the properties of polymer product obtained by polymerizing olefins in the presence of Ziegler-type catalysts vary greatly as a function of the monomers of choice, catalyst components, catalyst modifiers and a variety of other conditions which affect the catalytic polymerization process.

For the production of high strength film, it is desirable that polymer product have a high molecular weight. However, high molecular weight resins such as polyethylene, which generally are of a narrow molecular weight distribution are difficultly processable.

It is therefore desirable to provide polyolefin resins having a high molecular weight so as to obtain high strength films therefrom coupled with a broad molecular weight distribution so as to provide an easily melt processable resin. It is furthermore highly desirable that the resin be produced by a commercially feasible and economical process which obtains polymer product having a good balance of properties.

U.S. Pat. No. 4,434,242 of Roling et al, issued Feb. 28, 1984, teaches a polymerization process for preparing injection molded resins by polymerizing ethylene in the presence of a vanadium based catalyst. However, as taught in the patent, the process provides resins having a narrow molecular weight distribution suitable for injection molded resins rather than blow molded resins.

In European Patent Application 55589, Asahi teaches treating an oxide support with an organomagnesium composition, a chlorosilane and then treating with a titanium or vanadium compound that has at least one halogenated atom. As demonstrated in Example 7, the resin obtains a relatively narrow molecular weight distribution which is statistically in the same range as the resins produced in the presence of titanium based catalysts. The application discloses that the organomagnesium compound can be reacted with an electron donor in the liquid phase. Amongst the electron donors there are disclosed acyl halides.

In European Pat. No. 70,749 a catalyst is prepared by reacting an organic acyl halide with a magnesium alcoholate. The product is washed and thereafter reacted with a transition metal halide. The product is employed in combination with an organoaluminum cocatalyst for the production of polyethylene. The catalyst is said to have improved activity over French Pat. No. 2,324,652.

British Pat. No. 2,105,355 describes a gas-phase method for making elastomeric copolymers of ethylene and higher alpha-olefins in the presence of a vanadium-based catalyst. The catalyst is prepared by sequentially treating an inert oxide support with a vanadium compound, and an aluminum alkyl compound. The catalyst is not taught to be useful for the production of injection molded or blow molded resins but rather produces an elastomeric product.

Soviet Pat. No. 422,192 treats a silica support with an organoaluminum compound and a chlorinating agent and thereafter adds TiCl$_4$ to the material so as to obtain an active catalyst. The production of polyethylene having a high molecular weight and coupled with a broad molecular weight distribution is not disclosed.

In U.S. Pat. No. 4,435,519 of Veazey teaches the production of polyolefins such as polyethylene having a narrow molecular weight distribution in the presence of a vanadium-based catalyst, said catalyst obtained by treating an inorganic oxide support with an organometallic compound such as triethylaluminum, and a vanadium compound.

The above patents do not suggest how the disclosed processes might be modified to result in the formation of polymers having a broad molecular weight distribution coupled with a high molecular weight so as to provide resins suitable for the production of high-strength films.

Furthermore, the patents do not disclose catalyst systems which show excellent responsiveness to hydrogen during the polymerization reaction for the control of molecular weight, do not disclose or evidence the excellent comonomer response so as to produce ethylene copolymers and particularly LLDPE, and particularly do not disclose highly active catalyst systems which will produce a high molecular weight-broad molecular weight distributed polymeric resin.

In U.S. Pat. No. 3,622,548 there is disclosed a catalyst system useful for the production of high-molecular weight amorphous copolymers in the presence of a catalyst system comprising a suitable compound of Subgroups IV to VI and VIII of Mendeleeff's Periodic Table including titanium compounds and vanadium compounds, and an aluminum alkyl cocatalyst together with a catalytic activator which are perchlorocrotonic acid compounds having a perchlorocrotonyl residue.

In my cofiled application, U.S. Ser. No. 680,872, filed Dec. 12, 1984, I disclose a catalyst system comprising a vanadium-containing solid obtained by treating an inert support material with an organoaluminum compound, a halogenating agent, and a vanadium compound.

In accordance with this invention catalyst combinations have been found which have extremely high catalytic activities, good comonomer incorporation, excellent hydrogen responsiveness for the control of molecular weight and obtain polymer product manifesting a broad molecular weight distribution with greatly improved film properties. The resins exhibit excellent melt strength with a surprising decrease in power consumption, hence an increase in extrusion rates, as well as excellent MD tear strength.

The new catalyst systems and catalyst component of this invention are obtained by contacting an organoaluminum compound, an acyl halide and a vanadium metal compound in the presence of an oxide support. The catalyst system employing the vanadium based catalyst component is advantageously employed in a gas phase ethylene polymerization process since there is a significant decrease in reactor fouling as generally compared with prior art ethylene gas phase polymerization processes thereby resulting in less frequent reactor shut downs for cleaning.

SUMMARY OF THE INVENTION

In accordance with the objectives of this invention there is provided a vanadium based catalyst component useful for the polymerization of alpha-olefins comprising a solid reaction product obtained by treating an inert solid support material in an inert solvent with (A) an organoaluminum compound, (B) an acyl halide, and, (C) at least one vanadium compound.

The solid vanadium based catalyst component when employed in combination with a cocatalyst such as an alkyl aluminum cocatalyst provides a catalyst system which demonstrates a number of unique properties that are of great importance in the olefin polymerization technology such as, for example, extremely high catalytic activity, the ability to obtain high molecular weight resins and the ability to control the resin molecular weight during the polymerization reaction as a result of the improved responsiveness to hydrogen, increased polymer yield, and reduced reactor fouling. The resin so produced manifests a broad molecular weight distribution coupled with a high molecular weight thereby facilitating the production of films having improved melt strength and tear strength.

In a preferred embodiment of the invention the (A) organoaluminum compound can be represented by the formula $R_mAlX_{3-m}$ wherein R is a hydrocarbyl radical, X is a halogen atom and m can be greater than 0 to 3, the (B) acyl halide is represented by the formula $R'COX''$ wherein $R'$ is a hydrocarbyl group having from 1 to 20 carbon atoms, $X''$ is a halogen, and the (C) vanadium compounds which may be suitably employed in practicing this invention are hydrocarbon-soluble vanadium compounds in which the vanadium valence is 3 to 5. Mixtures of the vanadium compounds can be employed.

Although, in accordance with this invention, the order of addition in ingredients in forming the vanadium containing catalyst component can vary, the catalyst component is preferably prepared by first reacting the (A) organoaluminum compound with the inert solid support material which is preferably a Group IIa, IIIa, IVa or IVb metal oxide, or a finely divided polyolefin or other suitable support material and thereafter subjecting the system to treatment with the acyl halide followed by treatment with the vanadium compound. In an alternative preferred embodiment the acyl halide treatment can be performed as the step (A) or after the transition metal compound treatment.

In a second embodiment of this invention there is provided a catalyst system comprising the vanadium containing solid catalyst component and an organoaluminum cocatalyst for the polymerization of alpha-olefins using the catalyst of this invention under conditions characteristic of Ziegler polymerization.

In view of the high activity of the catalyst system prepared in accordance with this invention as compared with conventional vanadium based catalysts, it is generally not necessary to deash polymer product since polymer product will generally contain lower amounts of catalyst residues than polymer product produced in the presence of conventional catalyst.

The catalyst systems can be employed in a gas phase process, single phase melt process, solvent process or slurry process. The catalyst system is usefully employed in the polymerization of ethylene and other alpha-olefins, particularly alpha-olefins having from 3 to 8 carbon atoms and copolymerization of these with other 1-olefins or diolefins having from 2 to 20 carbon atoms, such as propylene, butene, pentene and hexene, butadiene, 1,4-pentadiene and the like so as to form copolymers of low and medium densities. The supported catalyst system is particularly useful for the polymerization of ethylene and copolymerization of ethylene with other alpha-olefins in gas phase processes to produce LLDPE or HDPE.

DESCRIPTION OF THE PREFERRED EMBODIMENTS

Briefly, the catalyst components of the present invention comprise the treated solid reaction product of (A) an organoaluminum compound, (B) an acyl halide, and (C) a vanadium compound in the presence of an inert support material. According to the polymerization process of this invention, ethylene, at least one alpha-olefin having 3 or more carbon atoms or ethylene and other olefins or diolefins having terminal unsaturation are contacted with the catalyst under polymerizing conditions to form a commercially useful polymeric product. Typically, the support can be any of the solid particulate porous supports such as talc, silica, zirconia, thoria, magnesia, and titania. Preferably the support material is a Group IIa, IIIa, IVa and IVb metal oxide in finely divided form.

Suitable inorganic oxide materials which are desirably employed in accordance with this invention include silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed. For example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out in vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are, for example, $SiCl_4$, chlorosilanes, silylamines and the like. The chemical dehydration is accomplished by slurrying the inorganic particulate material in an inert hydrocarbon solvent, such as, for example, heptane. During the dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature range during the chemical dehydration reaction can be from about 25° C. to about 120° C., however, higher and lower temperatures can be employed. Preferably the temperature will be from about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The preferred (A) organoaluminum compounds employed in this invention can be represented by the general formula $R_mAlX_{3-m}$ wherein R represents an alkyl group, cycloalkyl group or aryl group, X represents a halogen atom and m represents a suitable numeral within the range of $1 \leq m \leq 3$, or mixtures or complex compounds thereof. In particular, it is preferable to employ alkyl aluminum compounds wherein the alkyl groups have from 1 to 18 carbon atoms, preferably 1 to 9 carbon atoms. Illustrative but non-limiting examples of the organoaluminum compounds which may be suitably employed are the trialkylaluminums such as trimethyl aluminum, triethyl aluminum, tributyl aluminum, triisobutyl aluminum, tri-n-pentyl aluminum, tri-n-octyl aluminum, and the like. Illustrative examples of the dialkyl aluminum halides are diethyl aluminum chloride, diethyl aluminum fluoride, dimethyl aluminum chloride, dibutyl aluminum chloride, diethyl aluminum bromide, diethyl aluminum iodide and dibutyl aluminum iodide. Examples of the monoalkyl aluminum dihalides are methyl aluminum dichloride, ethyl aluminum dichloride, butyl aluminum dichloride, isobutyl aluminum dichloride, ethyl aluminum dibromide, ethyl aluminum diiodide, butyl aluminum dibromide and butyl aluminum diiodide. Moreover, the sesquihalides can be suitably employed such as ethyl aluminum sesquichloride and the like.

The molecular weight distribution is affected by the aluminum alkyls of choice. For example, the aluminum alkyls comprising the more reactive alkyl groups when employed result in a broader molecular weight distribution resin as reflected in the melt index ratio values as compared with those resins produced from the less reactive aluminum alkyls. It is also found that the catalyst prepared from the halide containing aluminum alkyls resulted in obtaining resins of broader molecular weight distribution. The preferred aluminum alkyls to be employed in accordance with this invention, therefore, are trimethyl aluminum, diethyl aluminum fluoride, isobutyl aluminum dichloride and ethyl aluminum dichloride.

The aluminum alkyls can be conveniently added to the agitated slurry containing the inert particulate support such as silica in liquid form, i.e., the aluminum alkyl is in solution, e.g., in hexane, benzene, toluene, etc. Alternatively, the aluminum alkyl can be added to the slurry in non-solution form.

In accordance with this invention, the acyl halides are employed to obtain increased catalytic activity over similar catalyst systems absent the acyl halide. It has been discovered that the use of acyl halide in order to obtain the desirable increase in activity also results in a resin having a broad molecular weight distribution coupled with a high molecular weight. The acyl halides which can be employed are chloro-, bromo-, and iodo-acyl halides. The acyl halides can be liquid or gaseous under the reaction conditions.

Any of the acyl halides may be usefully employed in accordance with this invention. The hydrocarbon portion of the acyl halides which can have from 1–20 carbon atoms do not contain aliphatic unsaturation can be an alkyl group, substituted alkyl group, aryl group, substituted aryl group or cycloalkyl group.

The preferred acyl halides can be represented by the formula $R^9COX$ wherein $R^9$ can be $C_1$ to $C_{20}$ alkyl group, substituted alkyl group, aryl group, substituted aryl group, or cycloalkyl group and X is a halogen. The preferred halogen is chlorine.

Illustrative but non-limiting examples of the acyl halides which can be employed in this invention are acetyl chloride, propanoyl chloride, butyryl chloride, butyryl bromide, isobutyryl chloride, benzoyl chloride, oleoyl chloride, acryloyl chloride, 6-hepteneoyl chloride, heptanoyl chloride, cyclohexanecarbonyl chloride, cyclopentanepropionyl chloride and the like. Acid chlorides based on polyacids may also usefully be employed such as, for example, dodecanedioyl chloride, succinyl chloride, camphoryl chloride, tetephthalloyl chloride and the like. The preferred acyl halides are acetyl chloride, benzoyl chloride, and p-methylbenzoyl chloride. Benzoyl chloride is especially preferred.

The acyl halide is preferably added to the reaction slurry which comprises the solid particulate material, or the solid reaction product from the treatment of the solid particulate material and the aluminum alkyl. The addition of the acyl halide can be effected by using a solution of the acyl halide in an inert solvent such as, for example, a aliphatic hydrocarbon solvent or a aromatic hydrocarbon solvent. The acyl halide can also be added as a gas. The acyl halide can also be added at tow separate steps, for example, after the aluminum alkyl treatment and thereafter after the vanadium compound treatment.

The vanadium compound which can be usefully employed in the preparation of the vanadium containing catalyst component of this invention are well known in the art and can be represented by the formulas $$VCl_x(OR)_{3-x},\quad (1)$$
(with a =O on V)

where x=0-3 and R=a hydrocarbon radical;

$$VCl_y(OR)_{4-y},\quad (2)$$

where y=3-4 and R=a hydrocarbon radical;

$$V(AcAc)_z,\quad (O)_{3-z}\quad (3)$$

where z=2-3 and (AcAc)=acetyl acetonate group;

$$VCl_2(AcAc)\text{ or }VCl(AcAc)_2,\quad (4)$$
(with =O on each V)

where (AcAc)=acetyl acetonate group; and $$VCl_3\cdot nl,\quad (5)$$

where n=2-3 and l=Lewis base, such as tetrahydrofuran, which can form hydrocarbon-soluble complexes with $VCl_3$.

In formulas 1 and 2 above, R preferably represents a $C_1$ to $C_8$ aliphatic radical free of aliphatic unsaturation or aromatic hydrocarbon radical such as straight- or branded-chemical alkyl, aryl, cycloalkyl, alkanyl, aralkyl group such as methyl, ethyl, propyl, isopropyl, butyl, n-butyl, i-butyl, t-butyl, pentyl, hexyl, cyclohexyl, octyl, benzyl, dimethyl phenyl, naphthyl, etc.

Illustrative, but non-limiting examples of the vanadium compounds are vanadyl trichloride, vanadium tetrachloride, vanadium tetrabutoxy, vanadium trichloride, vanadyl acetylacetonate, vanadium acetylacetonate, vanadyl dichloroacetylacetonate, vanadyl chloroclacetylacetonate, vanadium trichloride complexed with tetrahydrofuran, vanadyl tribromide, vanadium tetrabromide, and the like.

The vanadium compound is preferably added to the reaction mixture in the form of a solution. The solvent can be any of the well-known inert hydrocarbon solvents such as hexane, heptane, benzene, toluene, and the like.

The treatment of the support material as mentioned above is conducted in an inert solvent. The inert solvent can be the same as that employed to dissolve the individual ingredients prior to the treatment step. Preferred solvents include mineral oils and the various hydrocarbons which are liquid at reaction temperatures and in which the individual ingredients are soluble. Illustrative examples of useful solvents in addition to those mentioned above include the alkanes such as pentane, isopentane, hexane, heptane, octane and nonane; cycloalkanes such as cyclopentane, cyclohexane; and aromatics such as benzene, toluene, ethylbenzene and diethylbenzene. The amount of solvent employed is not critical. Nevertheless, the amount employed should be sufficient so as to provide adequate heat transfer away from the catalyst components during reaction and to permit good mixing.

The amounts of catalytic ingredients employed in the preparation of the solid catalyst component can vary over a wide range. The concentration of aluminum alkyl deposited on the essentially dry, inert support can be in the range from about 0.1 to about 10 millimoles/g of support, however, greater or lesser amounts can be usefully employed. Preferably, the organoaluminum compound concentration is in the range of 0.1 to 5 millimoles/g of support and more preferably in the range of 0.25 to 2.0 millimoles/g of support. The amount of acyl halide employed should be such as to provide a halogen to aluminum mole ratio of about 1 to about 20 and preferably 1 to 10.

The vanadium compound is added to the inert support reaction slurry at a concentration of about 0.1 to about 10 millimoles V/g of dried support, preferably in the range of about 0.1 to about 5 millimoles V/g of dried support and especially in the range of about 0.14 to 0.70 millimoles V/g of dried support.

Generally, the individual reaction steps can be conducted at temperatures in the range of about −50° C. to about 150° C. Preferred temperature ranges are from about −30° C. to about 60° C. with −10° C. to about 50° C. being most preferred. The reaction time for the individual treatment steps can range from about 5 minutes to about 24 hours. Preferably the reaction time will be from about ½ hour to about 8 hours. During the reaction constant agitation is desirable.

In the preparation of the vanadium metal-containing solid catalyst component, washing after the completion of any step may be effected.

The catalyst components prepared in accordance with this invention are usefully employed with cocatalysts well known in the art of the Ziegler catalysis for polymerization of olefins. Typically, the cocatalysts which are used together with the transition metal containing catalyst component are organometallic compounds of Group Ia, IIa and IIIa metals such as aluminum alkyls, aluminum alkyl hydrides, lithium aluminum alkyls, zinc alkyls, magnesium alkyls and the like. The cocatalysts preferably used are the organoaluminum compounds. The preferred alkylaluminum compounds are represented by the formula $AlR''_nX'''_{3-n}$ wherein $R''$ is hydrogen, hydrocarbyl or substituted hydrocarbyl group and n is as defined herein above. Preferably R' is an alkyl group having from 2 to 10 carbon atoms. Illustrative examples of the cocatalyst material are ethyl aluminum dichloride, ethyl aluminum sesquichloride, diethyl aluminum chloride, aluminum triethyl, aluminum tributyl, diisobutyl aluminum hydride, diethyl aluminum ethoxide and the like. Aluminum trialkyl compounds are most preferred with triisobutylaluminum and aluminum triethyl being highly desirable. $X'''$ is halogen and preferably chlorine.

The catalyst system comprising the aluminum alkyl cocatalyst and the vanadium metal containing solid catalyst component is usefully employed for the polymerization of ethylene, other alpha-olefins having from 3 to 20 carbon atoms, such as for example, propylene, butene-1, pentene-1, hexene-1, 4-methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer of preference is ethylene. The catalyst system may be usefully employed to produce polyethylene or copolymers of ethylene by copolymerizing with other alpha-olefins or diolefins, particularly propylene, butene-1, pentene-1, hexene-1, and octene-1. The catalyst is especially useful for the preparation of high molecular weight LLDPE and HDPE and have broad molecular weight distribution. The polymers may have a MI from 0.1 to 100 dg/min and MIR from about 20 to about 100. The olefins can be polymerized in the presence of the catalysts of this invention by any suitable known process such as, for example, suspension, solution and gas-phase processes.

The polymerization reaction employing catalytic amounts of the above-described solid catalyst can be carried out under conditions well known in the art of Ziegler polymerization, for example, in an inert diluent at a temperature in the range of 50° C. to 120° C. and a pressure of 1 and 40 atmospheres in the gas phase at a temperature range of 70° C. to 100° C. at about 1 atmosphere to 50 atmospheres and upward. Illustrative of the gas-phase processes are those disclosed in U.S. Pat. No. 4,302,565 and U.S. Pat. No. 4,302,566, which references are hereby incorporated in their entirety by reference. As indicated above, one advantageous property of the catalyst system of this invention is the reduced amount of gas phase reactor fouling. The catalyst system can also be used to polymerize olefins at single phase conditions, i.e., 150° C. to 320° C. and 1,000–3,000 atmospheres. At these conditions the catalyst lifetime is short but the activity sufficiently high that removal of catalyst residues from the polymer is unnecessary. However, it is preferred that the polymerization to be done at pressures ranging from 1 to 50 atmospheres, preferably 5 to 25 atmospheres.

Improved yields can be further obtained by employing polymerization promoters (activators) in combination with the catalyst system of this invention. The polymerization activators, in accordance with this invention, are preferably chlorocarbon activators. The activators are generally added to the polymerization reactor as a separate component. However, in the alternative, the activator can be adsorbed onto the surface of the catalyst component of this invention. The activator serves to significantly increase the productivity of the catalyst. Illustrative by non-limiting examples of the chlorocarbons are $CHCl_3$, $CFCl_3$, $CH_2Cl_2$, ethyltrichloroacetate, methyltrichloroacetate, hexachloropropylene, butylperchlorocrotonate, 1,3 dichloropropane, 1,2,3-trichloropropane, and 1,1,2-trichlorotrifluoroethane, etc. The activators may be gases or liquids at the conditions of polymerization.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in light of the below examples and such alternatives, modifications and variations fall within the general scope of the claims.

In the Examples following the silica support was prepared by placing Davison Chemical Company G-952 silica gel in a vertical column and fluidizing with an upward flow of $N_2$. The column was heated slowly to 800° and held at that temperature for 12 hours after which the silica was cooled to ambient temperature.

The melt index (MI) and melt index ratio (MIR) were measured in accordance with ASTM test D1238. The resin density was determined by density gradient column according to ASTM test D1505.

EXAMPLE 1

Preparation of Catalyst Component

A 5.0 g portion of Davison 952 silica was charged into a 125 cc vial equipped with a stirring bar. 25 ml of dry, degassed hexane was added via a syringe and the suspension stirred.

To the stirred suspension was added 1.25 mmoles of isobutyl aluminum dichloride in 1.14 ml of heptane solution. The slurry was stirred at 32° C. temperatures for 1 hour. To the reaction was then added 12.6 mmoles of neat benzoyl chloride. The reaction slurry was stirred at 32° C. for 1 hour. To the reaction slurry was then added dropwise 0.98 mmoles of vanadyl trichloride in 2.81 ml of hexane at ambient temperatures with constant stirring. The reaction was stirred for 1 hour at 32° C. Stirring was discontinued, the supernatant was decanted and the catalyst dried.

POLYMERIZATION

To a 1.8 liter stirred autoclave were charged 800 ml of purified and dried hexane, 2.6 mmoles of triisobutyl-aluminum in 3 ml of hexane solution and Freon-11 activator in a molar ratio of 200:1 activator to vanadium. Thereafter, a white oil slurry of the catalyst containing 0.20 g of catalyst component in 5 ml of oil was injected to the reactor via a syringe. The reactor was heated to 85° C., pressured to 30 psig with hydrogen and then pressured to a total pressure of 150 psig with ethylene. The reactor was maintained at the total pressure by constant ethylene flow. The polymerization was maintained for 40 minutes resulting in a polymer product having an MI of 1.83 and a MIR of 62.0. The specific activity was 35.0 Kg PE/gV-hr-mole/l.

EXAMPLE 2

The catalyst was prepared in the same manner as in Example 1 with the exception that 2.5 mmoles of tri-n-octyl in 5.3 ml of heptane solution was substituted for the isobutyl aluminum dichloride and 17.5 mmoles of benzyl chloride were added. The results of the polymerization are summarized in Table 1.

EXAMPLE 3

This catalyst was prepared in the same manner as in Example 1 with the exception that 10.0 mmoles of trimethylaluminum in 2.68 ml of hexane solution was substituted for the isobutylaluminum dichloride and 11.3 mmoles of benzoyl chloride were added. The results of the polymerization are summarized in Table 1.

EXAMPLE 4

This catalyst was prepared in the same manner as in Example 1 with the exception that 5.0 mmoles of diethylaluminum fluoride in 2.88 ml of heptane solution was substituted for the isobutylaluminum dichloride and 5.0 mmoles of benzoyl chloride were added. The results of the polymerization are summarized in Table 1.

EXAMPLES 5–8

Preparation of Catalyst Component

Samples of the catalysts prepared in Examples 1–4 were respectively employed in polymerization runs for Examples 5-8. The conditions for polymerization were the same as in Example 1 with the exception that the reactor was charged with hydrogen to a pressure of 10 psig, 30 cc of 1-butene and pressured to a total of 150 psig with ethylene. The ethylene to butene-1 ratio was maintained at a constant flow with injection of ethylene and butene-1. The results of the polymerizations are summarized in Table 1.

EXAMPLES 9-11

In the following examples the catalyst was prepared as indicated on silica (Davison 952) that had been dehydrated at 500° C.

EXAMPLE 9

Catalyst Preparation

Silica gel was charged to a 125 ml vial and slurried in 20 ml hexane. To the stirred suspension was added 3.0 ml of a 1.58M solution of triethylaluminum in heptane. The reaction slurry was stirred for 1 hour at 32° C. To the reaction slurry was added 1.31 ml (11.3 mmoles) of benzoyl chloride and stirring was continued for 1 hour at 32° C. To the vial was then added dropwise 0.99 mmoles of vanadyl trichloride in 1.41 ml of hexane solution, and the reaction mixture was stirred for 1 hour at 32° C. Stirring was discontinued, and after the slurry had settled the supernatant was decanted, and the catalyst was dried under a stream of dry nitrogen. Silica gel (5.0 g, Davison 952, dried at 500° C.) was charged to a 125 ml vial and slurried in 20 ml hexane. To the stirred suspension was added 3.0 ml of a 1.58M solution of triethylaluminum in heptane. The

Polymerization

To a 2.1 liter stirred autoclave reactor was charged 850 ml of purified dry hexane. The hexane was heated to 50° C. To this was added 1.8 mmoles triisobutyl aluminum in 2 ml of hexane solution. A white oil slurry containing 0.125 grams of the vanadium containing catalyst (0.05 g/cc) was injected into the reactor via a syringe. 8 mmoles of Freon-11 activator were then injected into the reactor. The reactor was heated to 85° C., 20 mmoles $H_2$ were added followed by 420 mmoles of butene, and it was pressured to a total of 150 psig with ethylene. The polymerization was maintained for 40 minutes after which time the reactor was vented to atmospheric pressure, and the polymer recovered and dried. The polymer had a MI of 4.83 dg/min, a MIR of 37.3 and a density of 0.9340 g/cc. The catalyst had a specific activity of 267 kg/PE/gV.mole.1$^{-1}$.atm, and a productivity of 736 grams PE/g catalyst.

EXAMPLE 10

Catalyst Preparation

Silica gel was charged to a 125 ml vial and slurried in 20 ml hexane. To the stirred suspension was added dropwise 3.5 mmoles of vanadyl trichloride in 5.0 ml of hexane solution, and the reaction mixture was stirred for 1 hour at 32° C.; 4.3 ml of a 1.58M solution of triethylaluminum in heptane were then added and the reaction slurry was stirred for 1 hour at 32° C. To the reaction slurry was added 2.4 ml (20.6 mmoles) of benzoyl chloride and stirring was continued for 1 hour at 32° C. Stirring was discontinued, and after the slurry had settled the supernatant was decanted, and the catalyst was dried under a stream of dry nitrogen.

Polymerization

To a 2.1 liter stirred autoclave reactor was charged 850 ml of purified dry hexane. The hexane was heated to 50° C. To this was added 1.2 mmoles triisobutyl aluminum in 1.3 ml of hexane solution. A white oil slurry containing 0.085 g of the vanadium containing catalyst (0.05 g/cc) was injected into the reactor via a syringe. 5.3 mmoles of Freon-11 activator were then injected into the reactor. The reactor was heated to 85° C., 20 mmoles $H_2$ were added followed by 210 mmoles of butene, and it was then pressured to a total of 150 psig with ethylene. The polymerization was maintained for 40 minutes after which time the reactor was vented to atmospheric pressure, and the polymer recovered and dried. The polymer had a MI of 0.41 dg/min, a MIR of 72, and a density of 0.9337 g/cc. The catalyst had a specific activity of 80 kg/PE/gV.mole.1$^{-1}$.atm, and a productivity of 847 grams PE/g catalyst.

EXAMPLE 11

Catalyst Preparation

Silica gel was charged to a 125 ml vial and slurried in 20 ml hexane. To the stirred suspension was added 4.3 ml of a 1.58M solution of triethylaluminum in heptane. To the vial was then added dropwise 3.5 mmoles of vanadyl trichloride in 5.0 ml of hexane solution, and the reaction mixture was stirred for 1 hour at 32° C. To the reaction slurry was then added 5.5 ml (47.3 mmoles) of benzoyl chloride and stirring was continued for 1 hour at 32° C. Stirring was discontinued, and after the slurry had settled the supernatant was decanted, and the catalyst was dried under a stream of dry nitrogen.

Polymerization

To a 2.1 liter stirred autoclave reactor was charged 850 ml of purified dry hexane. The hexane was heated to 50° C. To this was added 1.2 mmoles triisobutyl aluminum in 1.3 ml of heptane solution. A white oil slurry containing 0.085 grams of the vanadium containing catalyst (0.05 g/cc) was injected into the reactor via a syringe. 8 mmoles of Freon-11 activator were then injected into the reactor. The reactor was heated to 85° C., 20 mmoles $H_2$ were added followed by 210 mmoles of butene, and it was then pressured to a total of 150 psig with ethylene. The polymerization was maintained for 40 minutes after which time the reactor was vented to atmospheric pressure, and the polymer recovered and dried. The polymer had a MI of 0.30 dg/min, a MIR of 68 and a density of 0.9393 g/cc. The catalyst had a specific activity of 103 kg/PE/gV.mole.1$^{-1}$.atm, and a productivity of 1082 grams PE/g catalyst.

TABLE 1

| Example No. | Aluminum Alkyl[1] | Cl-Agent | Aluminum Alkyl to —OH Ratio | Cl-agent to Alkyl Ratio | MI | MIR | Specific Activity Kg PE/gV-hr-m/l $C_2$ |
|---|---|---|---|---|---|---|---|
| 1 | IBADIC | BzCl | 0.5 | 10.0 | 1.83 | 62.0 | 35.0 |
| 2 | TNOCTAL | BzCl | 1.0 | 7.0 | 34.1 | 46.4 | 68.8 |
| 3 | TMAL | BzCl | 1.5 | 3.0 | 20.1 | 40.9 | 202.5 |
| 4 | DEAF | BzCl | 2.0 | 1.0 | 40.2 | 40.9 | 97.5 |

TABLE 1-continued

| Example No. | Aluminum Alkyl[1] | Cl-Agent | Aluminum Alkyl to —OH Ratio | Cl-agent to Alkyl Ratio | MI | MIR | Specific Activity Kg PE/gV-hr-m/l C$_2$ |
|---|---|---|---|---|---|---|---|
| 5 | IBADIC | BzCl | 0.5 | 10.0 | 1.92 | 68.0 | 21.0 |
| 6 | TNOCTAL | BzCl | 1.0 | 7.0 | 23.9 | 34.4 | 239.4 |
| 7 | TMAL | BzCl | 1.5 | 3.0 | 26.9 | 33.9 | 396.2 |
| 8 | DEAF | BzCl | 2.0 | 1.0 | 99.0 | 27.7 | 99.4 |

What is claimed is:

1. A process for polymerization of ethylene and alpha-olefins having from 1 to 20 carbon atoms or mixtures of ethylene, alpha-olefins and diolefins which process comprises polymerizing one or more olefins in the presence of the catalyst system comprising (a) an organoaluminum cocatalyst, and (b) a vanadium containing catalyst component obtained by treating an inert solid support material in an inert solvent with
   (i) an organoaluminum compound represented by the formula $R_mAlX_{3-m}$, wherein R represents an alkyl group, cycloalkyl group or aryl group having from 1 to 18 carbon atoms, X represents halogen atoms, and $1 \leq m \leq 3$,
   (ii) an acyl halide, and
   (iii) a vanadium compound.

2. A process as in claim 1 wherein the vanadium compound is represented by the general formulas:

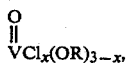  (1)

where x=0-3 and R=a hydrocarbon radical;

$VCl_y(OR)_{4-y}$,  (2)

where y=3-4 and R=a hydrocarbon radical;

  (3)

where z=2-3 and (AcAc)—acetyl acetonate group;

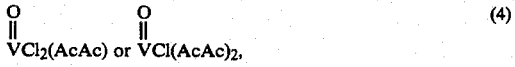  (4)

where (AcAc)=acetyl acetonate group; or $VCl_3 \cdot nL$,  (5)

where n=2-3 and L=a Lewis base which forms hydrocarbon-soluble complexes with $VCl_3$.

3. A process as in claim 2 wherein the acyl halide is selected from acetyl chloride, benzoyl chloride and p-methylbenzoyl chloride.

4. A process as in claim 1 wherein the inert solid support material is an inorganic oxide or mixtures of inorganic oxides.

5. A process as in claim 4 wherein the inorganic oxide is silica.

6. A proces as in claim 2 wherein the vanadium compound is selected from vanadyl trichloride, vanadium tetrachloride and vanadyl chloride dibutoxy.

7. A process as in claim 1 wherein the organo aluminum compound is selected from trimethylaluminum, triethylaluminum, triisobutylaluminum and tri-n-octylaluminum.

8. A processs as in claim 1 wherein the silica is contacted sequentially with the organoaluminum compound, the acyl chloride, and the vanadium compound.

9. A process as in claim 1 wherein the inert support material is contacted sequentially with the acyl chloride, the aluminum compound and the vanadium compound.

* * * * *